US012462027B2

(12) United States Patent
Smeu et al.

(10) Patent No.: US 12,462,027 B2
(45) Date of Patent: Nov. 4, 2025

(54) ROBUST FEATURE SELECTION FOR COMPUTER SECURITY APPLICATIONS

(71) Applicant: Bitdefender IPR Management Ltd., Nicosia (CY)

(72) Inventors: Stefan Smeu, Bacau (RO); Elena Burceanu, Buchare (RO); Emanuela Haller, Buchare (RO)

(73) Assignee: Bitdefender IPR Management Ltd., Nicosia (CY)

(*) Notice: Subject to any disclaimer, the term of this patent is extended or adjusted under 35 U.S.C. 154(b) by 98 days.

(21) Appl. No.: 18/401,364

(22) Filed: Dec. 30, 2023

(65) Prior Publication Data

US 2025/0086279 A1 Mar. 13, 2025

Related U.S. Application Data

(60) Provisional application No. 63/582,278, filed on Sep. 13, 2023.

(51) Int. Cl.
*G06F 21/56* (2013.01)
*G06F 21/00* (2013.01)
*G06F 21/55* (2013.01)

(52) U.S. Cl.
CPC ............ *G06F 21/56* (2013.01); *G06F 21/552* (2013.01)

(58) Field of Classification Search
CPC ........ G06F 21/56; G06F 21/552; G06F 21/50; G06F 21/55; G06F 21/554; G06F 21/562; G06F 21/57; G06F 21/577
See application file for complete search history.

(56) References Cited

U.S. PATENT DOCUMENTS

| | | |
|---|---|---|
| 2006/0179017 A1 | 8/2006 | Forman |
| 2009/0171870 A1 | 7/2009 | Dasgupta |
| 2009/0222389 A1 | 9/2009 | Hido |
| 2009/0300765 A1 | 12/2009 | Moskovitch |
| 2010/0036782 A1 | 2/2010 | Zhao |
| 2015/0235139 A1 | 8/2015 | Sharma |
| 2021/0241140 A1 | 8/2021 | Sadashiva |
| 2021/0342652 A1 | 11/2021 | Glassman |

(Continued)

OTHER PUBLICATIONS

European Patent Office (EPO), International Search Report and Written Opinion mailed Nov. 28, 2024 for PCT International Application No. PCT/EP2024/075366, International Filing Date Sep. 11, 2024, Priority Date Sep. 13, 2023.

(Continued)

*Primary Examiner* — Edward Zee
(74) *Attorney, Agent, or Firm* — Law Office of Andrei D Popovici, PC

(57) ABSTRACT

A diverse collection of data samples harvested for computer security applications is divided into a plurality of training corpora according to criteria such as an identity of the data source, among others. An initial set of features for characterizing the collected data samples is reduced to an optimal subset. For each candidate feature, a frequency distribution of feature values is determined over each of the training corpora. A feature selection procedure favors features whose frequency distribution is relatively similar across multiple corpora. A detector module is then trained to detect computer security threats according to the reduced set of features.

23 Claims, 8 Drawing Sheets

(56) References Cited

U.S. PATENT DOCUMENTS

2022/0027780 A1 1/2022 Butvinik
2022/0050928 A1* 2/2022 Shukla .................. G06N 20/00

OTHER PUBLICATIONS

Masud et al., "Cloud-Based Malware Detection for Evolving Data Streams," ACM Transactions on Management Information Systems (TMIS), ACM 2(3):1-27, Oct. 18, 2008.
Gupta et al., "Eagle: User Profile-Based Anomaly Detection for Securing Hadoop Clusters," 2015 IEEE International Conference on Big Data, IEEE, pp. 1336-1343, Oct. 29, 2015.
Dean, "Systematic Assessment of the Impact of User Roles on Network Flow Patterns," Dissertation, Naval Postgraduate School, Monterey, USA, Sep. 1, 2017.
Ye et al., "Towards a Theoretical Framework of Out-of-Distribution Generalization," Advances in Neural Information Processing Systems 34(2021): 23519-23531, Dec. 6, 2021.
Wikipedia, "Feature Selection," https://en.wikipedia.org/w/index.php?title=Feature_selection&oldid=1185233924, downloaded Dec. 20, 2023.

* cited by examiner

ROBUST FEATURE SELECTION FOR COMPUTER SECURITY APPLICATIONS

CROSS-REFERENCE TO RELATED APPLICATIONS

This application claims the benefit of the filing date of U.S. Provisional Patent Application No. 63/582,278, filed on Sep. 13, 2023, titled "Feature Selection for Robust Anomaly Detectors," the entire contents of which are incorporated by reference herein.

BACKGROUND OF THE INVENTION

The invention relates to machine learning, and in particular to optimally selecting input features for classifiers used in computer security applications including detection of malicious software, intrusion, and online fraud.

Computer security is a major branch of information technology, directed at protecting users and computing appliances against malicious software, intrusion, and fraudulent use. In its many forms such as computer viruses, spyware, and ransomware, malicious software (malware) affects millions of devices, making them vulnerable to fraud, loss of data and sensitive information, identity theft, and loss of productivity, among others.

Another persistent threat comes from online fraud, especially in the form of phishing and identity theft. Sensitive identity information such as usernames, IDs, passwords, social security and medical records, bank and credit card details obtained fraudulently by international criminal networks operating on the Internet are used to withdraw private funds and/or are further sold to third parties. Beside direct financial damage to individuals, online fraud also causes a range on negative side effects on the economy, such as increased security costs for companies, higher retail prices and banking fees, declining stock values, lower wages and decreased tax revenue.

The explosive growth in mobile computing has only exacerbated computer security risks, with millions of devices such as smartphones and tablet computers constantly connected to the Internet and acting as potential targets for malware and fraud attempts.

Various computer security methods and software may be used to protect users and computers against such threats. Modern systems and methods increasingly rely on artificial intelligence (AI) pre-trained to distinguish between malicious and benign samples. A typical example of an AI-based malware detector includes a neural network configured to receive a vector of feature values characterizing an input sample and produce an output indicative of whether the respective sample is malicious or not.

However, AI-based methods face substantial technical challenges of their own. One example is the choice of input features. Typically, there are no obvious or universal criteria for choosing which features of target software are more likely to reveal malice and/or to differentiate between malicious and benign behavior. Furthermore, no single set of malware-indicative features may work reliably across a highly heterogeneous collection of devices such as desktop computers, mobile computing platforms (smartphones, wearables, etc.) and Internet of Things (IoT) appliances. The problem is further complicated by deliberate attempts by sophisticated malware to evade detection. Malware may tailor its behavior according to a type of device (e.g. smartphone vs. tablet, one manufacturer or model vs. another), a type of operating system, a current geographical location of the respective device, etc. Some malware further selects its victims by searching the respective device for indicators of a user's worth to the attacker. For instance, malware may determine what other software is currently installed on the respective device, and search for specific applications such as banking, social media, etc. Other malware may monitor a user's pattern of accessing various applications, online resources, etc. Such malware may then launch an attack only on carefully selected devices and/or against carefully selected users, when the respective attack is seen as more likely to pay off.

To address the variability of malware and the heterogeneity of the host devices, some conventional approaches substantially increase the count of features and therefore the size of AI models in an attempt to improve their performance. However, large neural networks are notoriously costly to implement and train, and typically require large training corpora which are difficult to acquire, annotate, and maintain. Another common approach uses unsupervised training, wherein the AI system is configured to construct its own set of features according to the available training corpus. However, such self-generated features are typically uninformative to a human user, and there is no guarantee that they will perform as expected when applied to data samples previously unseen by the respective AI system.

For all the reasons outlined above, there is a considerable interest in developing more robust and reliable AI-based computer security systems and methods.

SUMMARY OF THE INVENTION

According to one aspect, a computer system comprises at least one hardware processor configured to select a reduced subset of features from a plurality of features available for characterizing data samples. Selecting the reduced subset of features comprises dividing a collection of data samples acquired from a plurality of computing devices into a plurality of training corpora, selecting a candidate feature from the plurality of features, determining a first frequency distribution of feature values of the candidate feature over members of a first training corpus of the plurality of training corpora, and determining a second frequency distribution of feature values of the candidate feature over a second training corpus of the plurality of training corpora. Selecting the reduced subset of features further comprises determining whether to include the candidate feature into the reduced subset of features according to a similarity between the first and second frequency distributions. The at least one hardware processor is further configured to, in response to selecting the reduced subset of features, train a threat detector to determine whether a target data sample is indicative of a computer security threat according to the reduced subset of features.

According to another aspect, a computer security method comprises employing at least one hardware processor of a computer system to select a reduced subset of features from a plurality of features available for characterizing data samples. Selecting the reduced subset of features comprises dividing a collection of data samples acquired from a plurality of computing devices into a plurality of training corpora, selecting a candidate feature from the plurality of features, determining a first frequency distribution of feature values of the candidate feature over members of a first training corpus of the plurality of training corpora, and determining a second frequency distribution of feature values of the candidate feature over a second training corpus of the plurality of training corpora. Selecting the reduced subset of features further comprises determining whether to include the candidate feature into the reduced subset of features according to a similarity between the first and second frequency distributions. The method further comprises employing the at least one hardware processor to, in response to selecting the reduced subset of features, train a threat detector to determine whether a target data sample is indicative of a computer security threat according to the reduced subset of features.

According to another aspect, a non-transitory computer-readable medium stores instructions which, when executed by at least one hardware processor of a computer system, causes the computer system to select a reduced subset of features from a plurality of features available for characterizing data samples. Selecting the reduced subset of features comprises dividing a collection of data samples acquired from a plurality of computing devices into a plurality of training corpora, selecting a candidate feature from the plurality of features, determining a first frequency distribution of feature values of the candidate feature over members of a first training corpus of the plurality of training corpora, and determining a second frequency distribution of feature values of the candidate feature over a second training corpus of the plurality of training corpora. Selecting the reduced subset of features further comprises determining whether to include the candidate feature into the reduced subset of features according to a similarity between the first and second frequency distributions. The instructions further cause the computer system to, in response to selecting the reduced subset of features, train a threat detector to determine whether a target data sample is indicative of a computer security threat according to the reduced subset of features.

BRIEF DESCRIPTION OF DRAWINGS

The foregoing aspects and advantages of the present invention will become better understood upon reading the following detailed description and upon reference to the drawings where.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized collection of data. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

Figure 1:
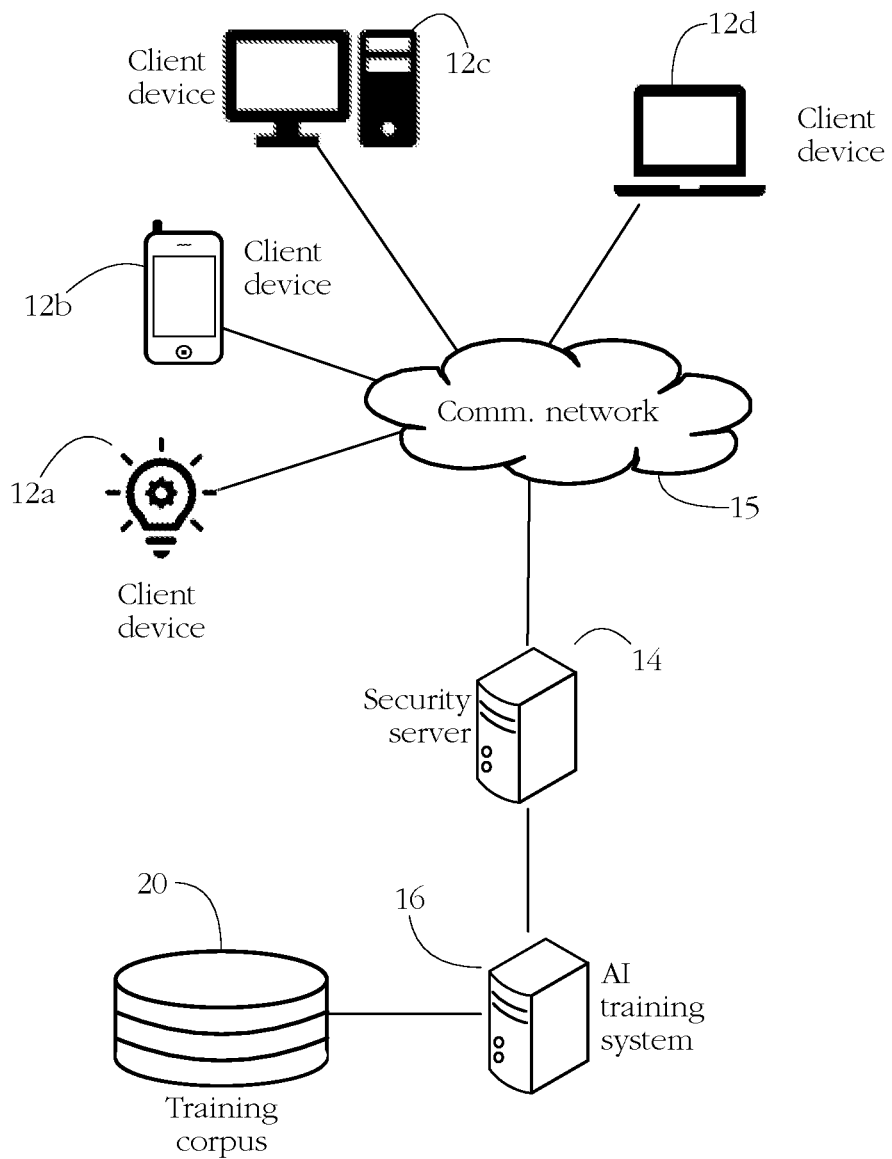
FIG. 1 shows a plurality of client devices protected against computer security threats according to some embodiments of the present invention.

FIG. 1 shows a plurality of client devices 12a-d protected against computer security threats according to some embodiments of the present invention. Exemplary client devices 12a-d include personal computer systems, corporate mainframe computers, mobile computing platforms (e.g., laptop computers, tablets, smartphones), entertainment devices (e.g., TVs, game consoles), wearable devices (e.g., smartwatches, fitness bands), household appliances (e.g., thermostats, refrigerators), and any other electronic device comprising a hardware processor, a memory, and a communication interface enabling the respective device to communicate with other devices/computer systems. In some embodiments, each client device 12a-d includes a threat detector module 40 configured to protect the respective device against computer security threats. Any such detector module may be embodied as a set of connected computer programs executing on at least one hardware processor of the respective client device. The operation of threat detectors is described in more detail below.

Exemplary client devices 12a-d are connected to a communication network 15, which may include a local area network (e.g., home network, corporate network, etc.), a wide-area network and/or the Internet. Network 15 generically represents a set of hardware (physical layer) and software interfaces enabling the transfer of data between devices 12a-d and other entities connected to network 15.

FIG. 1 further shows a security server 14 connected to communication network 15. Server 14 generically represents a set of communicatively coupled computer systems, which may or may not be in physical proximity to each other. Server 14 may be configured to protect the plurality of clients 12*a-d* against threats by analyzing data received from the respective devices. Such protection may pe tailored to each device, device group, user, or user group, and various parameters of the respective protection service may be defined via a subscription/service agreement, etc.

In some embodiments, security server 14 may collect various data from individual client devices without active involvement of the respective devices. For instance, some embodiments extract forensic data by intercepting network traffic at various points within communication network 15. In alternative embodiments, each client device 12*a-d* may collaborate with server 14 to protect each respective device. In other words, computer security activities may be divided between components executing on the respective device and components executing on server 14. For instance, each client device may collect and pre-process data indicative of a behavior of software executing on the respective device, and then send such data to server 14.

In turn, server 14 may run an instance of threat detector module 40 configured to analyze data received or collected from each client and return a security indicator to the respective client, the security indicator indicating whether the analyzed data is indicative of a computer security threat.

FIG. 1 further shows an artificial intelligence (AI) training system 16 communicatively coupled to security server 14. AI training system 16 generically represents a set of interconnected computer systems tasked with training a detector module comprising artificial intelligence components to detect computer security threats according to data received from client devices.

Training herein denotes a machine learning procedure whereby a set of parameters of a threat detector module are adjusted to improve a performance of the respective detector. In some exemplary embodiments as described below, various components of a threat detector may include artificial neural networks having a substantial number of adjustable parameters such as synapse weights, among others. In such embodiments, training includes adjusting the respective parameters in order to minimize an objective function commonly known in the art as a cost. An exemplary cost function may be determined according to a difference between an output of the respective detector when presented with a training sample and an expected or desired output associated with the respective training sample. Several training procedures are known in the art, including various versions of supervised, semi-supervised, and unsupervised learning procedures.

Figure 2:
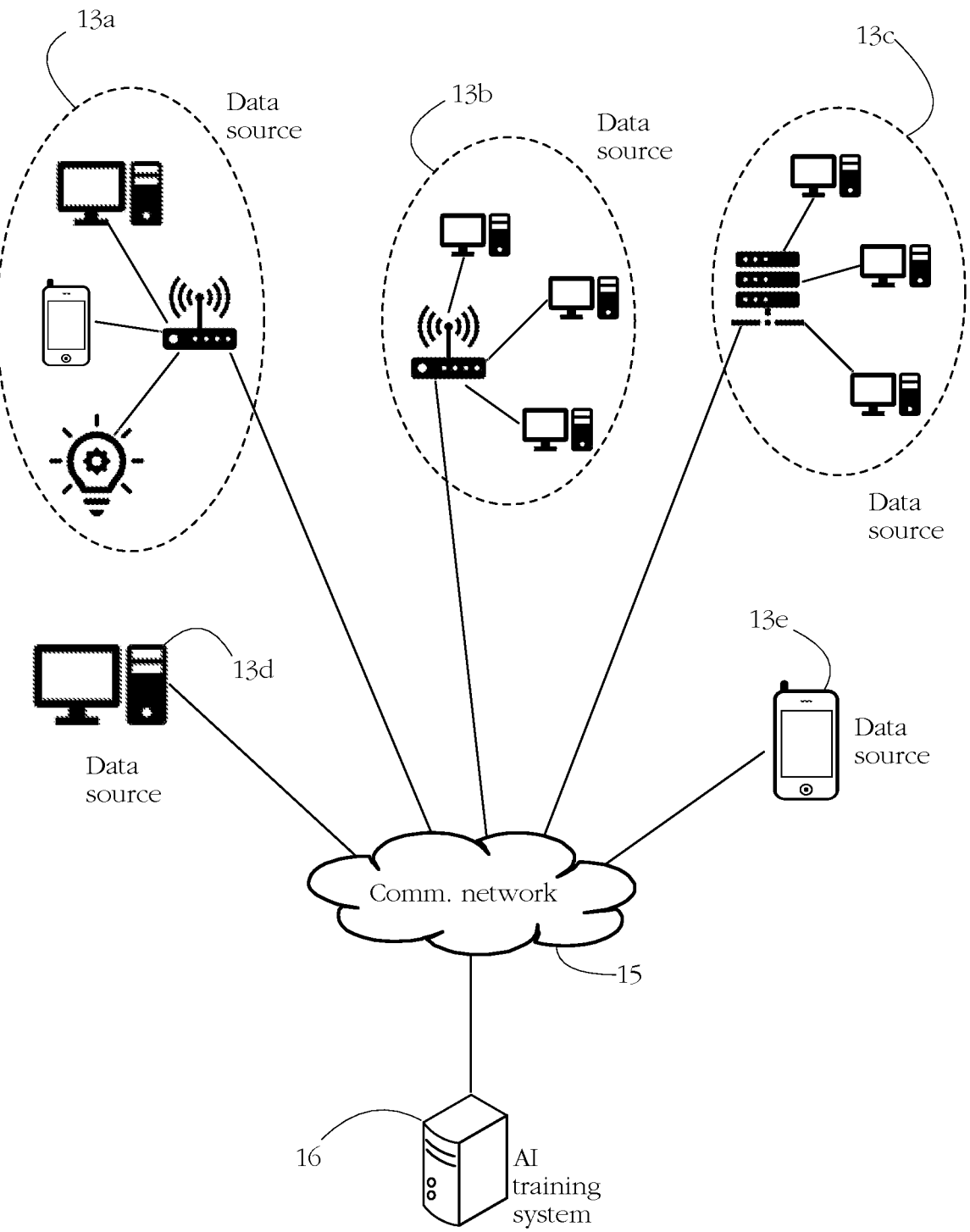
FIG. 2 illustrates an exemplary artificial intelligence (AI) training system collecting data from a plurality of data sources according to some embodiments of the present invention.

FIG. 2 shows AI training system 16 receiving training data from a plurality of data sources 13*a-e*. Such sources may include individual computers and/or computing appliances (sources 13*d-e*) and computer systems (e.g., sources 13*a-c*) including multiple individual machines. In one such example, data source 13*a* represents a household wherein multiple individual devices such as smartphones, tablet computers, household appliances, entertainment devices, wearable devices, etc., access the Internet via a gateway device/edge router and contribute data to AI training system 16. Meanwhile, exemplary data sources 13*b-c* may represent distinct corporate computer networks, or distinct network domains of a corporate network.

Figure 3:
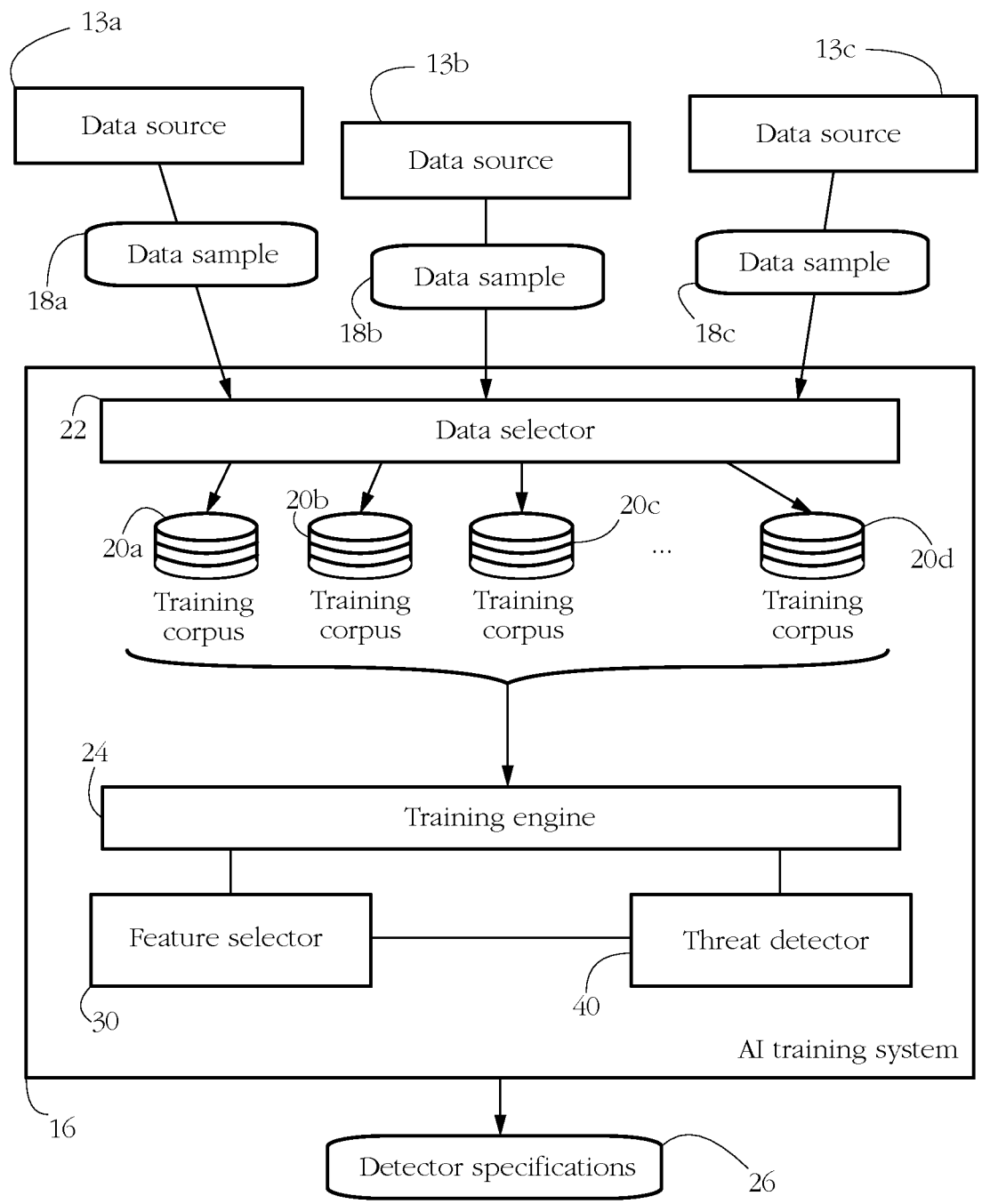
FIG. 3 shows exemplary components of an AI training system according to some embodiments of the present invention.

FIG. 3 shows exemplary components of AI training system 16 according to some embodiments of the present invention. Some or all of the illustrated components may be embodied as computer programs executing on hardware processors of system 16. In alternative embodiments, some components may be embodied in specialized hardware such as ASICs, FPGAs, etc., or as a combination of hardware and software. AI training system 16 comprises a data selector component 22 configured to receive data samples 18*a-c* from respective data sources 13*a-c* and to construct a plurality of training corpora 20*a-d* according to the received data samples. Data samples 18*a-c* generically represent any type of data known in the art to be informative for computer security. The content of such samples depends according to the type of computer security threat (e.g., malware vs. online fraud, etc.). Some examples include an encoding of a sequence of computing events having occurred on a respective computer (e.g., a content of a system log), and a content of a section of a memory of the respective computer. Other exemplary data samples 18*a-c* include indicators of network traffic, such as various traffic metadata. Yet another exemplary data sample 18*a-c* includes a content of an electronic message (e.g., a message exchanged via an instant messaging app, an email message, a social media post, a small message service-SMS message, etc.). Other exemplary samples 18*a-c* may include media files (sounds, images, video, etc.).

In some embodiments, training corpora 20*a-d* include data samples 18*a-c*, selectively organized into individual corpora according to various criteria such as an identity of a computer/data source, an identity of a user, a time, a geographical location and/or network address of a respective computer/data source, among others. More details on organizing training data into individual corpora are given below.

In some embodiments, AI training system 16 further comprises a training engine 24 connected to a feature selector 30 and an instance of detector module 40. Engine 24 is configured to manage and coordinate the activities of detector module 40 and feature selector 30, as well as to implement a procedure for training detector 40. Engine 24 is further configured to output a result of training, for instance a detector specification 26 comprising a set of optimal values for detector parameters (e.g., network architecture specifications, synapse weights, etc.) resulting from training.

Figure 4:
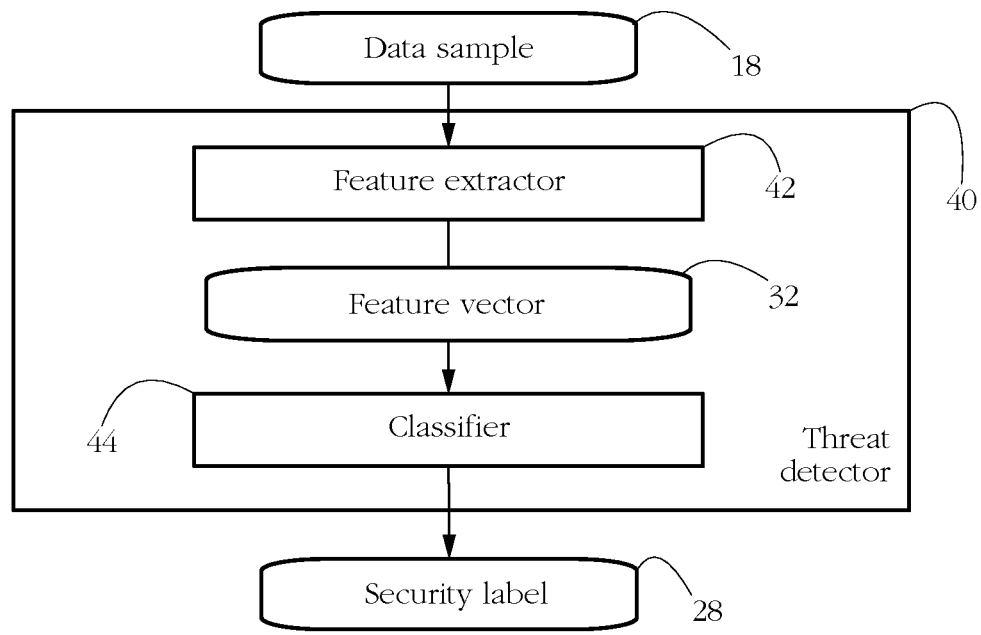
FIG. 4 illustrates exemplary components of a threat detector module according to some embodiments of the present invention.

FIG. 4 shows an exemplary structure of threat detector 40, comprising a feature extractor 42 connected to a classifier 44. In some embodiments, detector 40 is configured to receive a data sample 18 and to output a security label 28 indicative of whether sample 18 is indicative of a threat or not. The training instance of threat detector 40 executing as part of AI training system 16 receives input samples 18*a-c* selected by training engine 24 from training corpora 20*a-d*, as detailed further below.

The type of threat detected by module 40 varies among embodiments. Without loss of generality, most of the description below will focus on embodiments that detect the presence or activity of malicious software (malware). In such cases, security label 28 may indicate whether the respective client device is infected or not. However, a skilled artisan will know that the described embodiments may be adapted to detecting other threats, such as online fraud, intrusion/hacking, deep fakes, etc. In yet another class of applications, threat detector 40 comprise an anomaly detector configured to determine whether a respective data sample 18 follows a normal or expected pattern of behavior of the respective client device, or instead departs from such a normal pattern of behavior. In such embodiments, security label 28 may indicate whether data sample 18 is anomalous. Anomalies may further indicate a threat, such as intrusion/hacking.

Figure 5:
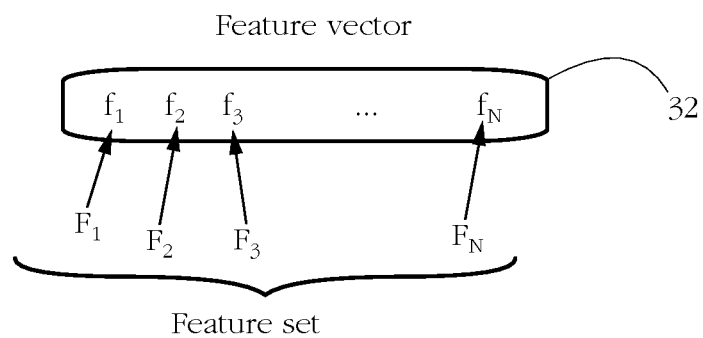
FIG. 5 shows an exemplary generic feature vector according to some embodiments of the present invention.

Feature extractor 42 is configured to determine a set of feature values collectively characterizing data sample 18. An exemplary feature vector 32 is illustrated in FIG. 5 and comprises feature values $f_1 \ldots f_N$, each feature value $f_i$ comprising a value of a respective feature $F_i$ of sample 18. Features $F_i$ herein refer broadly to any attribute of data sample 18 known in the art of computer security, that can be used to determine whether a client device is subject to a computer security threat such as malware, fraud, hacking, etc. Features $F_i$ may be determined or selected "manually" (i.e., by human operators) or determined automatically, for instance via unsupervised learning. Some such features may themselves be indicative of a threat, while others may indicate the presence of a threat only when co-occurring with other features. Exemplary features include so-called 'static' features such as features extracted from a content of memory, a content of a file or folder (e.g., an Android® manifest file), a content of an electronic message, or an image displayed on a screen of the respective client device. Other static features may be determined according to a current OS setting, a content of an OS registry, etc. Other exemplary features include behavioral or so-called 'dynamic' features indicating whether a particular software entity has performed a specific action, such as opening a file, changing an access permission, launching a child process, injecting code into another software entity, sending an electronic communication (e.g., an HTTP request for a remote resource), etc. Some feature values $f_i$ may be derived according to values of other features $f_j$. Feature values $f_i$ may be numerical, strings, Boolean, etc., depending on the type of the respective feature. In typical embodiments, the count N of features is relatively large, e.g., in the hundreds or thousands, but the present description applies in general to any number of features.

To determine feature vector 32, feature extractor 42 may implement any method known in the art of computer security. Evaluating static features may include signature matching by way of hashing or other methods. Signature matching generally determines whether a memory of a client device stores a specific piece of code/sequence of instructions commonly known in the art as a malware signature. Evaluating dynamic features may include parsing a sequence of computing events (e.g., a system log) to detect the occurrence of specific hardware or software event such as an application install, uninstall, and update, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary detected events include a requests to access a peripheral device (e.g., hard disk, SD card, network adapter, microphone, camera), a request to access a remote resource (e.g., a hypertext transfer protocol—HTTP request to access a particular URL, an attempt to access a document repository over a local network), a request formulated in a particular uniform resource identifier scheme (e.g., a mailto: or a ftp: request), and an attempt to send an electronic message (e.g., email, short message service—SMS, etc.), among others. Yet other exemplary events comprise moving a user interface/window displayed by the respective client device in and/or out of focus/foreground.

In some embodiments, extracting dynamic features may further comprise detecting various timing-related events, such as periods of inactivity, i.e., time gaps between events and/or time intervals when the respective client device is idle, registers no user activity, or carries out only internal system tasks. Such inactive periods may be further differentiated into short gaps (e.g., of the order of a seconds) and long gaps (e.g., of the order of minutes to hours). Other timing-related events may include, for instance, a sequence of events occurring in quick succession/bursts of activity.

Other exemplary dynamic features comprise receiving and/or displaying a particular type of content, such as a SMS including a hyperlink, an HTML document including a login form, a payment interface, an advertisement, etc.

Extracting dynamic features specific to, or particularly relevant to the security of, mobile devices include detecting events such as screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

In some embodiments, features $F_i$ are higher-order features derived according to other, more basic features of input data. For instance, extractor 42 may evaluate a set of primary features of data sample 18, such as indicators of occurrence of specific events on a respective client device. Extractor 42 may then combine multiple primary features into a composite feature, for instance comprising a linear combination of the primary features. In one such example, extractor 42 carries out a singular value decomposition (SVD) or a principal component analysis (PCA) of the evaluated primary features, producing a set of composite features with at least one composite feature $F_i$ comprising a principal component of the respective primary features.

In another exemplary embodiment constructing composite features, extractor 42 comprises a set of artificial neural networks (collectively known in the art as an encoder) configured to compute a projection of input data sample 18 in an abstract vector space, the projection commonly known as an embedding. Stated otherwise, individual features $F_i$ may comprise projections of data sample 18 along individual axes of the embedding space. Meanwhile, elements $f_i$ of feature vector 32 may comprise coordinates of a point in the embedding space, the respective coordinates $f_i$ determined according to current values of some primary attributes/features of data sample 18 by way of a specific mathematical transformation. The respective embedding space/mathematical transformation may be determined automatically via a machine learning procedure wherein some parameters of feature extractor 42 are tuned to satisfy pre-determined goals, such as minimizing a cost function determined according to an input and an output of feature extractor 42 and/or of detector 40. In some embodiments, feature extractor 42 is co-trained with classifier 44.

Classifier 44 comprises a module (e.g., a set of computer programs) configured to determine security label 28 according to feature vector 32. For instance, classifier 44 may be configured to distinguish among a plurality of classes/categories of data and to determine which class/category data sample 18 falls into according to feature vector 32. Exemplary classes include a class representing normal behavior and another class representing anomalous behavior. Other exemplary classes include clean and infected. Yet other exemplary classes indicate distinct types of malicious agents or attack strategies. An artisan will know that such classes are given only as examples and are not meant to be limiting. Furthermore, the examples presented herein may be adapted as needed, to detecting other computer security threats, such as online fraud, deep fakes, etc.

Classifier 44 may implement any classification method known in the art of data mining. Examples include decision trees, clustering methods (e.g., k-means or related), and artificial neural networks, among others. The latter may further include feed-forward networks, autoencoders, various components of neural networks specialized in image, text, and natural language processing, such as recurrent neural networks (RNN), long short-term memory (LSTM) architectures, convolutional neural networks, transformer neural networks (e.g., generative pre-trained transformers—GPT), etc. Some architectural and functional details of such neural networks go beyond the scope of the present description.

Figure 6:
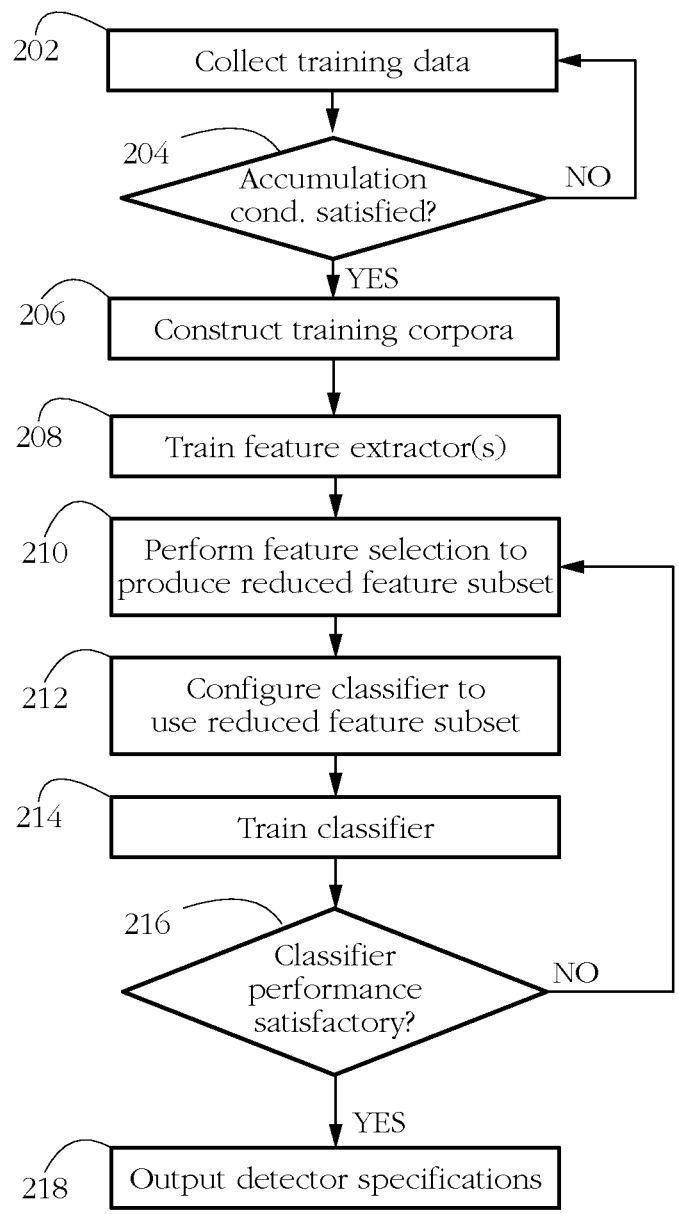
FIG. 6 shows an exemplary sequence of steps performed by an AI training system according to some embodiments of the present invention.

FIG. 6 shows an exemplary sequence of steps carried out by AI training system 16 in some embodiments of the present invention. Steps 202-204 collect training data such as samples 18 received from various data sources 13a-e until an accumulation condition is satisfied. Various accumulation conditions may be used, such as collecting a pre-determined total number of samples, a pre-determined number of samples per data source 13a-e, a pre-determined number of samples per type of device, and collecting incoming samples for a pre-determined amount of time. Then, in a step 206 data selector 22 may construct multiple training corpora (see e.g., corpora 20a-d in FIG. 3) by organizing collected training data according to various criteria.

Some embodiments rely on the observation that collected data can be seen to include at least two components. A first component herein denoted as the "signal" carries information relevant to a computer security threat, for instance computing events indicative of the presence or activities of malicious software. A second component herein denoted as a "background" carries information related to a context or environment in which malware operates. The background component corresponds for instance to the benign, normal activities carried out on the respective computing device. However, the signal and the background components are entangled within the collected data, and it is not a-priori clear which features of said data are more informative or characteristic of one or the other of the components. Some embodiments exploit the assumption that an attempt to separate the signal from the background may benefit from dividing a heterogeneous collection of data into individual corpora 20a-d (FIG. 3), wherein each individual corpus is characterized by a distinct type of background, while the signal component is similar across multiple corpora. Optimal feature selection may then comprise comparing the performance of a selected feature across distinct corpora 20a-d, as described below. Features which are relatively insensitive to switching between one corpus and another should therefore be better suited for characterizing the signal, compared to other features.

Some embodiments divide the collected data samples 18a-c (FIG. 3) into separate training corpora 20a-d according to various attributes of the data source providing each respective sample. One exemplary criterion is a location of the respective data source 13a-e. In other words, distinct samples 18a-c received from the same location may be placed into the same corpus, while distinct samples 18a-c received from distinct locations may be placed into distinct training corpora 20a-d. Location herein encompasses physical (physical address, geographical location, etc.) and logical/virtual locations (network domain, network address, Internet Protocol-IP address, Universal Resource Identifier-URI, etc.).

A strategy of constructing distinct training corpora according to a location of the data source relies on the observation that each data source (e.g., each household, company, network domain, etc.) may have its own particularities in the way the respective computing devices are used. For example, computers of an accounting firm may be used in manner which is different from computers of an engineering firm or a university. Furthermore, the division into individual corpora may be done with various levels of granularity. For instance, some embodiments may distinguish between data samples 18a-c received from distinct departments of the same organization. In one such example, data samples harvested from the marketing and production divisions of the same company are placed in distinct training corpora 20a-d.

In one example of corpus creation according to geographical location, data samples 18a-c collected from devices/sources located within the same country or region may be grouped together into the same training corpus, while samples collected from distinct countries/regions may be binned into distinct corpora 20a-d. In alternative embodiments, data sources/devices may be distinguished according to a language, a keyboard layout, a computing locale, etc., so that data samples received from devices having the same characteristics are grouped into the same training corpus.

An alternative criterion for constructing individual training corpora 20a-d comprises an identity of a user of the computing device providing a respective data sample 18a-c. In other words, distinct training corpora 20a-d may consist of data received from distinct users or user groups. When a user operates multiple computing devices, data samples harvested from all such devices may be placed within the same training corpus. Conversely, when a device is used by multiple users, data samples 18a-c harvested from the respective device may be placed into distinct training corpora, according to the identity of the user operating the respective device at the time of collection of the respective data sample.

Another exemplary criterion used in constructing training corpora 20a-d comprises a device type of the source of the respective data sample. A device type may be defined by an appliance type (e.g., smartphone vs. desktop computer vs. thermostat), a manufacturer (e.g., Apple, Inc., vs. Samsung Electronics), and a communication protocol (Bluetooth™ vs. Wi-fi™), among others. In some such embodiments, data samples 18a-c received from devices of the same type are grouped together in the same training corpus. In contrast, samples harvested from distinct types of devices may be placed into distinct training corpora.

Yet another exemplary criterion for constructing training corpora 20a-d comprises a software profile of the device supplying each data sample. In some embodiments, a software profile comprises a specific set of software applications or application types installed and/or used on the respective computing device. Some such embodiments may install a profiling agent on each device providing training data to AI training system 16, the profiling agent tasked with compiling a list of software applications currently installed and/or in use on the respective device. Data selector 22 may then divide the contributing data sources into a plurality of categories according to software profiles, so that data samples 18a-c received from devices having the same software profile are binned together into the same training corpus, while samples from devices having distinct software profiles are distributed to distinct training corpora. Such embodiments rely on the observation that the behavior of a device/user may essentially depend on the kind of software installed on the respective machine. For instance, the behavior of a gamer may be substantially different from the behavior of an accountant, and the difference may be reflected in the type of software installed and/or frequently used on the respective devices. Placing data samples collected from these categories of users into distinct training corpora may therefore ensure that the "noise" or "background" component of one corpus is distinct among the distinct corpora.

Another exemplary criterion for dividing data samples 18a-c into training corpora 20a-d is time. For instance, each training corpus 20a-d may consist of samples collected during a distinct time interval. Exemplary time intervals may distinguish between working hours and leisure time/weekends/holidays, based on the observation that computing behavior may differ between the two.

Yet another exemplary criterion for dividing training samples into distinct corpora (step 206 in FIG. 6) comprises a method of constructing data samples 18a-c. Such criteria may apply in particular to synthetic training data intentionally produced for training detectors 40. Some such examples comprise deepfake data (AI-generated or -enhanced images, video, sound, etc.), as well as machine-generated text (e.g., output of various chatbots). In such examples, data selector 22 may distinguish between samples produced using distinct methods. For instance, samples 18a-c produced using the same method (or group of methods) may be placed in the same training corpus, while samples produced using distinct methods may be binned into distinct training corpora.

Some other alternative embodiments may use more sophisticated methods of organizing collected training data, for instance applying a clustering algorithm to divide collected data samples 18a-c into a plurality of clusters, wherein substantially similar samples belong to the same cluster, irrespective of their data source/user. In such embodiments, each distinct cluster of samples (or subset of clusters) may form a separate training corpus 20a-d. One such example applies to detection of online fraud, wherein a collection of messages may be divided into multiple clusters according to various criteria, for instance according to a type or category of fraud (e.g., insurance fraud vs. Nigerian fraud vs. cryptocurrency fraud). Distinct training corpora 20a-d may then be constructed to include the contents of selected clusters.

In some embodiments wherein feature extractor(s) 42 include AI components, for instance when feature extractor(s) 42 are configured to calculate an embedding representation of an input data sample, extractors 42 need to be trained to produce the required feature vectors (a step 208 in FIG. 6). Some feature extractors 42 are co-trained with classifier 44, in the sense that the cost function used in training is determined according to an output of classifier 44, and that training comprises tuning parameters of both the feature extractor(s) and the classifier according to the value of the respective cost function. In alternative embodiments, feature extractor(s) are trained independently from classifier 44 and/or using distinct training corpora.

Figure 7:
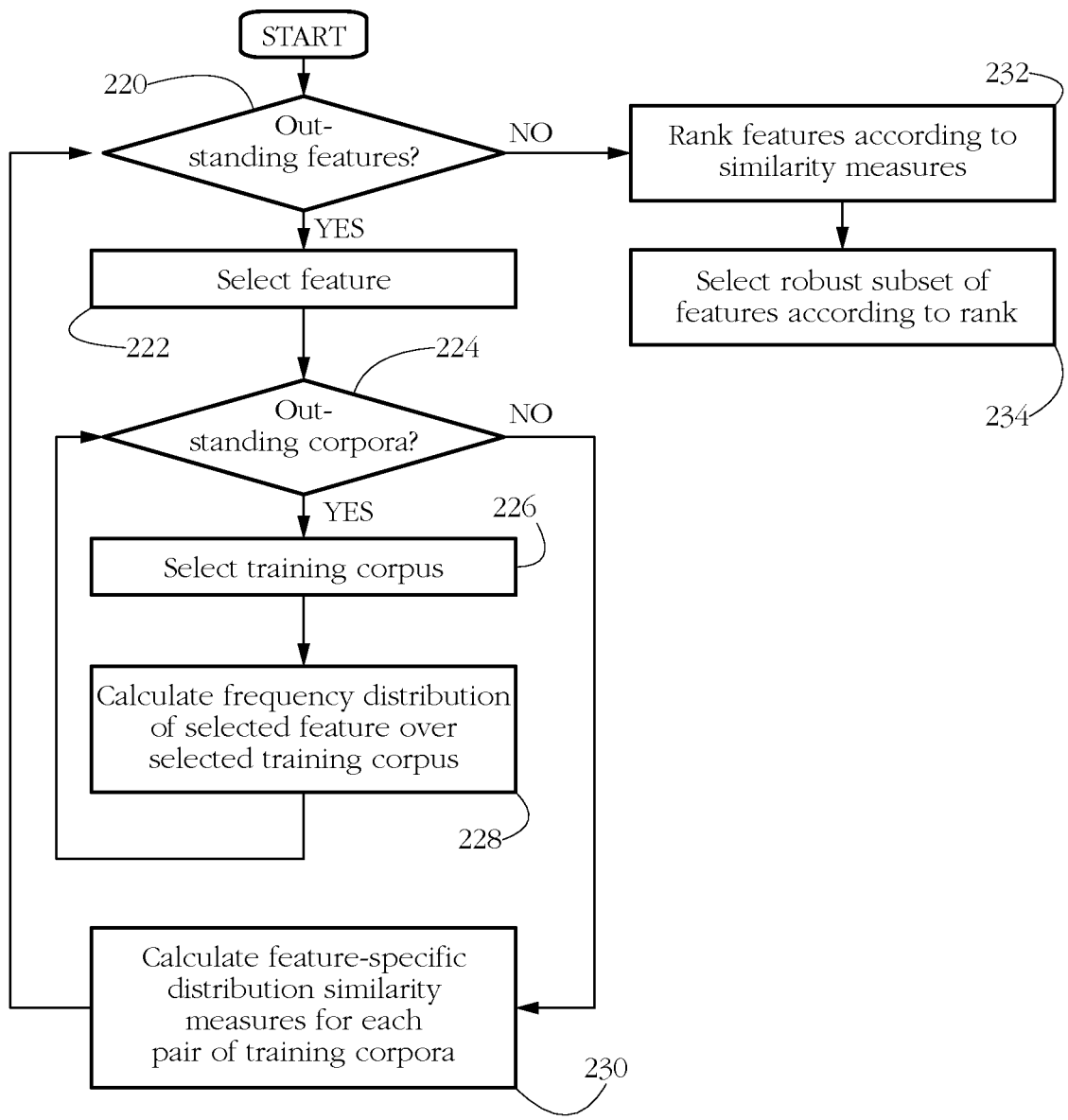
FIG. 7 shows an exemplary feature selection procedure according to some embodiments of the present invention.
Figure 8:
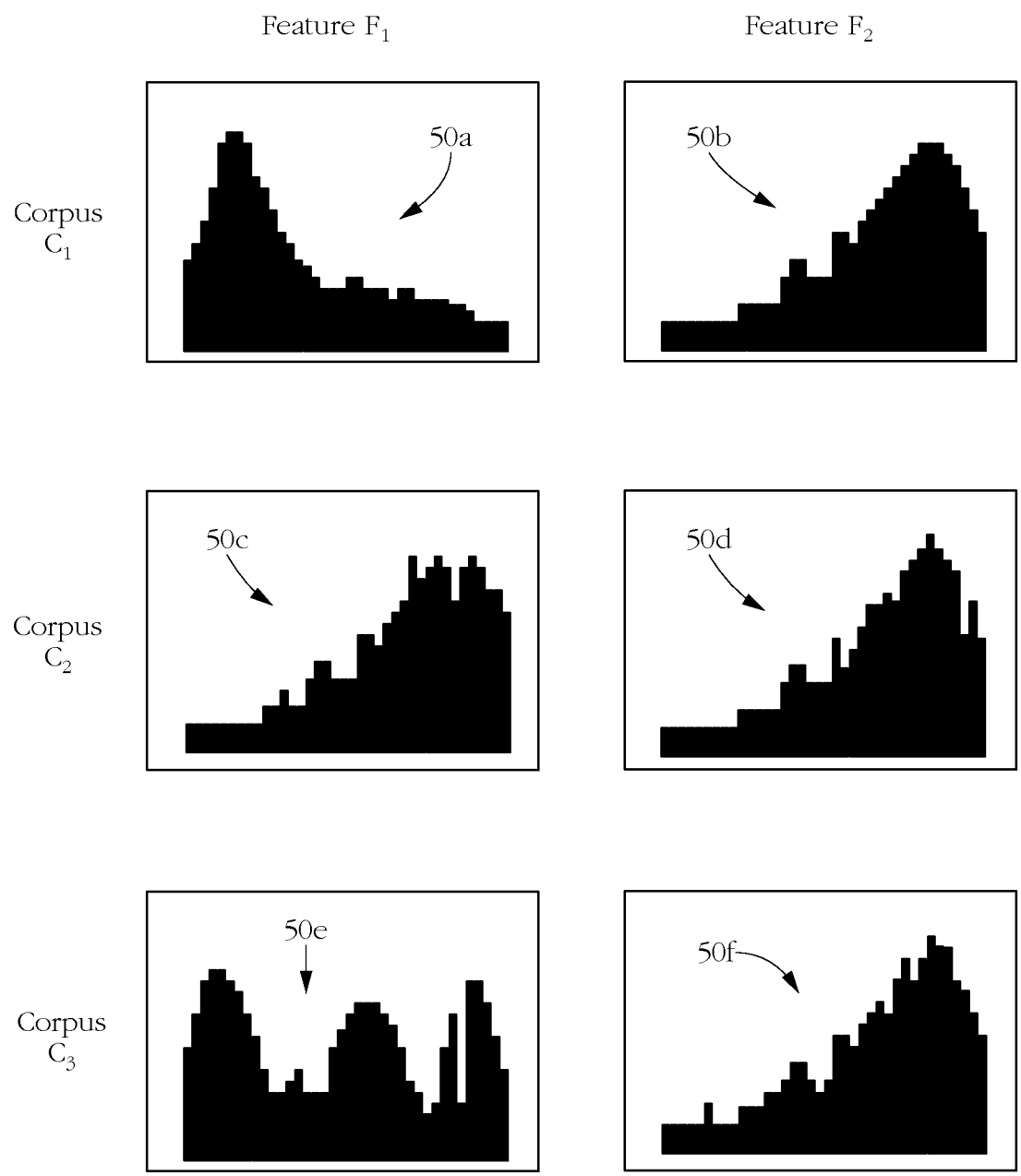
FIG. 8 shows exemplary statistical distributions of values of selected data features according to some embodiments of the present invention.

Executing step 208 configures feature extractors 42 to evaluate an initial set of features $F_i$ for characterizing collected data samples 18a-c. A step 210 may then perform a feature selection procedure comprising reducing the initial set of features to an optimal, reduced feature subset. FIG. 7 illustrates an exemplary feature selection procedure according to some embodiments of the present invention. A sequence of steps 220-222 cycles through all available initial features. For each feature $F_i$ herein deemed a candidate feature, steps 224-226 then cycle through all training corpora 20a-d constructed in step 206 (FIG. 6). For each such training corpus $C_j$, a step 228 may calculate a distribution of feature $F_i$ over corpus $C_j$, i.e., compute values $f_i$ of the respective candidate feature F; for at least a part of the respective corpus of samples. Some embodiments may further determine a frequency distribution of feature $F_i$ by dividing the range of the respective feature into bins and counting how many data samples 18a-c within the respective corpus $C_j$ are characterized by $f_i$ values within each bin. The resulting counts may be normalized to the total count of samples in the respective corpus. FIG. 8 shows exemplary frequency distributions 50a-f, wherein the left column represents frequency distributions of an exemplary feature $F_1$, while the right column represents frequency distributions of another exemplary feature $F_2$. The upper, middle and bottom rows show distributions calculated over three distinct exemplary training corpora $C_1$, $C_2$ and $C_3$, respectively. Each individual graph comprises a set of bins (rectangles), wherein each bin corresponds to a distinct feature value $f_i$ (or range of values $\Delta f_i$), while the height of the respective bin/rectangle is indicative of a count of instances/frequency of the respective feature value within the respective training corpus $C_j$.

When all frequency distributions of the selected feature have been evaluated (step 224 returns a NO), in a step 230 training engine 24 may calculate a set of similarity measures, each such measure $\sigma_i^{j,k}$ quantifying a similarity between a respective pair $\{j,k\}$ of frequency distributions of feature F; determined in step 228 over training corpora $C_j$ and $C_k$. Using the exemplary distributions illustrated in FIG. 8, a similarity measure $\sigma_1^{1,2}$ may quantify a similarity between distributions 50a and 50c, while a similarity measure $\sigma_2^{2,3}$ may quantify a similarity between distributions 50d and 50f. Step 230 may thus return a feature-specific set of similarity measures $S_i = \{\sigma_i^{j,k}\}_{j,k=1, \ldots, M}$, wherein M denotes the count of training corpora 20a-d.

Step 228 may use any manner of calculating a similarity between two statistical distributions. Exemplary embodiments determine measures $\sigma_i^{j,k}$ according to a Wasserstein metric:

$$\sigma_i^{j,k} = \left(\frac{1}{n}\sum_{b=1}^n |P_b^{(j)} - P_b^{(k)}|^\alpha\right)_i^{1/\alpha}, \qquad [1]$$

wherein the range of feature $F_i$ is divided into n bins, b indexes individual bins, $P_b^{(j)}$ denotes a frequency (e.g., normalized count) of value $f_i$ falling within bin b within corpus $C_j$, and $\alpha$ is a positive constant (e.g., $\alpha=1$). Alternatively, $\sigma_i^{j,k}$ may be determined according to a Kullback-Leibler divergence:

$$\sigma_i^{j,k} = \left[\sum_{b=1}^n P_b^{(j)} \log\left(\frac{P_b^{(j)}}{P_b^{(k)}}\right)\right]_i \qquad [2]$$

Both Wasserstein and Kullback-Leibler distances are relatively small when the respective statistical distributions are similar, and relatively large otherwise.

When all similarity measures have been evaluated for all currently available features $F_i$ and all training corpora (step 220 returns a NO), a step 232 may rank features $F_i$ according to the calculated similarity measures $\sigma_i^{j,k}$. A rank $R_i$ of feature $F_i$ is determined according to a respective set of similarity measures $S_i = \{\sigma_i^{j,k}\}_{j,k=1, \ldots, M}$, for instance according to an average (e.g., mean, median) and/or according to a dispersion (e.g., range, variance, standard deviation) of the set $S_i$.

A further step 234 may then select a reduced subset of features according to the ranking determined in step 232. Some embodiments rely on the observation that features whose distribution is relatively stable (i.e., varies less) across multiple training corpora are likely to be more robust to changes between data sources. Stated otherwise, selecting such features as input to classifier 44 is likely to make classifier 44 more robust when applied to data from new sources, i.e., data it has not previously encountered in training. Therefore, in some embodiments, features $F_i$ whose average $\sigma_i^{j,k}$ value indicates that their frequency distribution is relatively stable across multiple corpora receive relatively higher rankings than features whose frequency distribution changes substantially from one training corpus to another. For instance, some embodiments may rank features according to the average similarity measure $\langle \sigma_i^{j,k} \rangle_{j,k}$ over all pairs of training corpora, with smaller averages corresponding to higher rankings. In the example of FIG. 8, some embodiments rank feature $F_2$ higher than feature $F_1$, since the distribution of feature $F_1$ changes less from corpus $C_1$ to $C_2$ and $C_3$ than does the distribution of feature $F_2$. Step 234 may then select a pre-determined number or a pre-determined proportion (e.g., 80%, 50%, etc.) of the highest-ranking features F; into the reduced feature subset.

In response to a completion of the feature selection procedure, in a step 212 (FIG. 6) training engine 24 may reconfigure classifier 44 to exclusively use the reduced set of selected features as input. In a further step 214, engine 24 may train the reconfigured classifier/threat detector on some or all training corpora 20a-d. Such training may comprise, for instance, presenting classifier 44 with training data samples and adjusting parameters of classifier 44 according to an output produced by classifier 44.

In some embodiments, a step 216 determines whether the trained classifier meets a pre-determined performance criterion, for instance according to a receiver operating characteristic curve (ROC) determined over the training corpus. Other performance criteria may include a computational cost, a speed of operation, etc. If classifier 44 is found satisfactory, in a step 218 AI training system 16 may output detector specifications 26, which may include, for instance, architecture specifications and internal parameter values resulting from training. Detector specifications 26 may then be used by security server 14 and/or client devices 12a-d (FIG. 1) to instantiate a local version of the trained threat detector 40.

In some embodiments, when evaluations show that detector 44 does not meet performance criteria (step 216 returns a NO), training engine 24 may rerun at least a part of the feature selection procedure (step 210), for instance to select other features into the reduced feature subset, or to change a proportion of features included in the reduced feature subset. A computer experiment applying some of the methods described herein to image processing has found that the performance of the classifier steadily improved as the initial feature set was progressively reduced to approximately 50% of its initial content, after which the performance markedly degraded. Some embodiments may use a similar progressive reduction of the feature set in computer security applications, monitoring the performance of the classifier and stopping the feature selection process before the performance of the classifier degrades.

Figure 9:
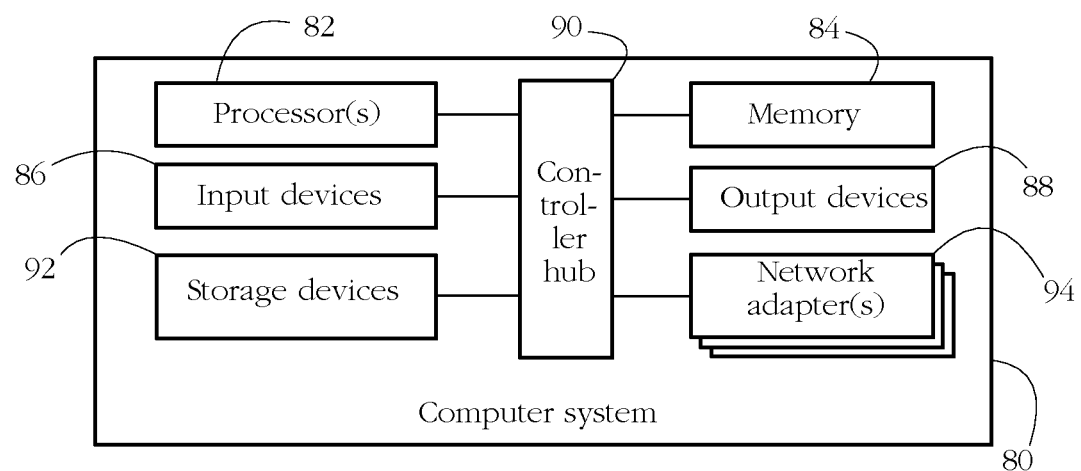
FIG. 9 shows an exemplary hardware configuration of a computer system programmed to execute some of the methods described herein.

FIG. 9 shows an exemplary hardware configuration of a computer system 80 programmed to execute some of the methods described herein. Computer system 80 generically represents any client device 12a-d, as well as security server 14 and AI training system 16 in FIG. 1. The illustrated computing system is a personal computer; other devices such as servers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g, network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable an efficient detection of computer security threats such as malware and intrusion. Embodiments of the present invention address an important technical problem of artificial intelligence (AI), namely that AI systems are typically trained on one set of data and then applied to another set of data. Although AI has strong generalization capabilities, it is not α priori clear how well a trained AI system will perform on data it has not encountered in training. Some embodiments of the present invention address this problem via a feature selection procedure whereby a set of initial features characterizing input data is reduced to a selected subset of features that is likely to be robust to novelty.

Some embodiments rely on the observation that real-world data collected for automatic classification and/or anomaly detection includes two distinct contributions or components. One component herein deemed "the signal" comprises the particular aspect of the data that is targeted by the respective classifier/detector. In the example of malware detection, the sought-after signal may comprise the behavior of malicious software. The other component may be described as a "background" and comprises other aspects of the data or of the monitored system that are unrelated to or less informative of the above mentioned signal. The distinction between signal and background may be easily understood using an analogy from image processing. An automatic image segmentation system may be tasked with determining whether an input image shows a bicycle—the signal in the current analogy. However, real images almost never show isolated bicycles; instead, they are surrounded by other objects, such as buildings, people, other vehicles, etc., which act as a background. When presented with an image, the segmentation system will likely extract a set of image features and then feed the respective feature values into a classifier configured to determine whether the respective image shows a bicycle or not. However, it is often unclear which of the respective image features are actually characteristic of a bicycle, and which are characteristic of a person, building, or of a particular landscape surrounding the bicycle in the respective training image. When the extracted features are too sensitive to or too informative about the background, the respective classifier may fail when presented with images of a type it has not encountered in training (e.g., a bicycle on a mountain trail).

Similarly, in computer security applications, a detector may be trained to detect a threat (e.g., malware) by monitoring software behavior. However, the data collected for monitoring purposes encodes both the occasional malicious activities (i.e., the sought-after signal) and the benign, normal behavior of a user of the respective computer system (herein the background or environment of the respective signal). Just as in the image processing example, the detector module may extract a set of features from the collected data, but it is not α-priori clear which features are more informative of the malicious activities, as opposed to the user's legitimate behavior. When the extracted features are too sensitive to the user's benign behavior, the respective malware detector may fail when tasked with analyzing data from a user it has not seen in training.

Some embodiments rely on the observation that a feature selection procedure trying to single out features which are more informative about the signal as opposed to the background may benefit from dividing training data into multiple individual corpora, wherein each distinct corpus predominantly contains samples having a distinct type of background, while at the same time having the same type of signal as the contents of other corpora. In the image processing example, one corpus may consist mostly of images of bicycles in an urban environment, and another corpus may consist mostly of images of bicycles on country roads. A similar approach may apply to computer security applications, because the way computers are used may differ substantially among users. For instance, an engineer may open other types of applications and access other online resources than an accountant. Meanwhile, malware (i.e., the "signal") presumably operates in a manner which is largely independent of user.

Based on such observations, some embodiments of the present invention divide collected training data into distinct corpora $20a$-$d$ so that each corpus may predominantly include a distinct type of background, i.e., normal or benign user behavior. Examples include placing data collected from distinct users, distinct computers, distinct households, distinct corporate clients, distinct network domains, etc., into separate training corpora. In other exemplary embodiments, data collected during distinct time intervals (working hours vs. nights, weekends, and holidays) are placed in distinct training corpora. Other exemplary criteria for dividing collected data into distinct corpora may include a type of device (e.g., desktop vs. laptop computers vs. mobile computing devices, Microsoft Windows® vs. other operating systems), a geographical location (e.g., each country or region placed in a distinct corpus).

Some embodiments then carry out a feature selection procedure wherein each available feature is ranked according to its frequency distribution over each training corpus. Features whose distribution is relatively stable across multiple corpora may be ranked higher than other features based on the assumption that they may be more adept at characterizing the signal component. A reduced feature set comprising higher-ranking features is selected and used to train a classifier for detecting computer security threats.

Feature selection has always been a major preoccupation of the machine learning community. Many feature selection strategies are known in the art. However, conventional feature selection typically comprises determining how well a selected feature correlates with an output (actual or desired) of a classifier. Stated otherwise, some features are better than others at distinguishing between classes (e.g., benign/malicious), and are therefore considered more useful to the respective classification task. Another conventional feature selection strategy determines a correlation between features across a training corpus. A relatively strong correlation indicates that the two features encode roughly the same information, and therefore one of the two may be dropped from the feature set. Crucially, all such conventional feature selection procedures typically use a single training corpus.

In contrast, some embodiments use multiple carefully constructed training corpora, and the feature selection procedure described herein explicitly relies on corpus-specific quantities, such as a distribution of a selected feature over a selected corpus. Furthermore, corpus construction forms an important part of the feature selection procedure, as the criteria for dividing collected data samples into distinct corpora may ultimately determine which features are selected into the reduced feature set. In other words, the contents of the reduced feature set may vary according to what is considered "the background" of the respective training data. In addition, feature selection according to some embodiments of the present invention is oblivious to the output of the classifier and/or to the actual class of the respective data sample, relying instead on the feature values themselves.

Some important benefits resulting from feature selection as described herein include a substantial reduction of the computational cost associated with both training and using a smaller feature set. In machine learning it is known that computational costs scale approximately with the square of the size of the feature vector, so a reduction in the number of features by just 25% is likely to reduce the associated computational burden by almost one half. Such dramatic reductions positively impact user experience and facilitate an implementation of reliable computer security software on devices such as smartphones and Internet of things (IoT) appliances that lack the processor and memory resources of a desktop or laptop computer. Further potential benefits include a reduced time-to-market, facilitating frequent updates of the security software that keep up with rapidly evolving threats. Remarkably, the reduction in computational burden is further accompanied by an increase in detection performance, as shown by computer experiments.

Another advantage of some embodiments described herein is a remarkable robustness of the detectors when presented with diverse, previously unseen data. Since the feature selection procedure presented herein deliberately favors features which are less informative of the background/environment, the resulting systems perform well on novelty tasks, as shown in computer experiments.

Although the above discussion primarily focused on computer security applications, the described systems and methods may be adapted to other applications, such as image processing (e.g., segmentation, search, annotation, detection of deep fakes) and natural language processing (e.g., detection of online fraud, detection of automatically generated text and chatbots, authorship attribution, etc.). For instance, some embodiments may divide a corpus of chatbot-generated text into distinct training corpora according to a type/identity of the chatbot that produced the respective text (e.g., ChatGPT® vs. LlamaChat®), with each distinct corpus comprised mostly of samples from a single source/type of chatbot. A chatbot detector may then be trained to use a reduced set of features selected according to some of the methods described herein. Such detectors are expected to perform well when presented with autogenerated text from an unknown source.

Furthermore, some embodiments may help extend machine learning/AI methods which are currently used in fields such as natural language processing to other fields of information technology. Examples include the automatic analysis, annotation, reverse engineering, and generation of computer code, which are increasingly importing methods from natural language processing. One exemplary embodiment of the present invention may construct multiple training corpora wherein each distinct corpus comprises mostly code written in a distinct programming language (e.g., C++ vs. Java vs. Python), distinct programming paradigm (e.g., imperative vs. declarative vs. object-oriented), distinct markup standard, etc. Applying the feature selection procedures described herein may lead to robust code embeddings which are relatively language-insensitive and therefore advantageous in applications such as malware detection and classification.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to:
select a reduced subset of features from a plurality of features available for characterizing data samples, wherein selecting the reduced subset of features comprises:
dividing a collection of data samples acquired from a plurality of computing devices into a plurality of training corpora;
selecting a candidate feature from the plurality of features,
determining a first frequency distribution of feature values of the candidate feature over members of a first training corpus of the plurality of training corpora,
determining a second frequency distribution of feature values of the candidate feature over a second training corpus of the plurality of training corpora, and
determining whether to include the candidate feature into the reduced subset of features according to a similarity between the first and second frequency distributions; and
in response to selecting the reduced subset of features, train a threat detector to determine whether a target data sample is indicative of a computer security threat according to the reduced subset of features.

2. The computer system of claim 1, wherein the at least one hardware processor is configured to divide the collection of data samples into the plurality of training corpora according to a location of a computing device providing each respective data sample.

3. The computer system of claim 1, wherein the at least one hardware processor is configured to divide the collection of data samples into the plurality of training corpora according to an identity of a user of a computing device providing each respective data sample.

4. The computer system of claim 1, wherein the at least one hardware processor is configured to divide the collection of data samples into the plurality of training corpora according to a time of acquisition of each respective data sample.

5. The computer system of claim 1, wherein the at least one hardware processor is configured to divide the collection of data samples into the plurality of training corpora according to a device type of a computing device providing each respective data sample.

6. The computer system of claim 1, wherein the plurality of computing devices is divided among a plurality of corporate owners, and wherein the at least one hardware processor is configured to divide the collection of data samples into the plurality of training corpora according to an owner of a computing device providing each respective data sample.

7. The computer system of claim 1, wherein the at least one hardware processor is configured to divide the collection of data samples into the plurality of training corpora according to a software profile of the computing device providing each respective data sample, the software profile comprising a set of computer programs installed for execution on the respective computing device.

8. The computer system of claim 1, wherein determining whether to include the candidate feature into the reduced subset of features further comprises:
determining a plurality of similarity measures, each similarity measure of the plurality of similarity measures quantifying a similarity between a pair of frequency distributions of values of the candidate feature, each of the pair of probability measures evaluated over a distinct corpus of the plurality of training corpora; and
selecting the candidate feature into the reduced subset of features according to an average of the plurality of similarity measures.

9. The computer system of claim 8, wherein the at least one hardware processor is configured to select the candidate feature into the reduced subset of features further according to a dispersion of the plurality of similarity measures.

10. The computer system of claim 1, wherein determining whether to include the candidate feature into the reduced subset of features further comprises:
for each feature of the plurality of features, evaluating a feature-specific frequency distribution of feature values of the respective feature over the first training corpus;
ranking the plurality of features according to the evaluated feature-specific frequency distributions; and
selecting the candidate feature into the reduced subset of features according to a result of the ranking.

11. The computer system of claim 1, wherein the plurality of features is constructed automatically by a machine learning procedure comprising training another threat detector to identify members of the collection of data samples that are indicative of the computer security threat.

12. A computer security method comprising employing at least one hardware processor of a computer system to:
select a reduced subset of features from a plurality of features available for characterizing data samples, wherein selecting the reduced subset of features comprises:
dividing a collection of data samples acquired from a plurality of computing devices into a plurality of training corpora;
selecting a candidate feature from the plurality of features,
determining a first frequency distribution of feature values of the candidate feature over members of a first training corpus of the plurality of training corpora,
determining a second frequency distribution of feature values of the candidate feature over a second training corpus of the plurality of training corpora, and
determining whether to include the candidate feature into the reduced subset of features according to a similarity between the first and second frequency distributions; and
in response to selecting the reduced subset of features, train a threat detector to determine whether a target data sample is indicative of a computer security threat according to the reduced subset of features.

13. The method of claim 12, comprising dividing the collection of data samples into the plurality of training corpora according to a location of a computing device providing each respective data sample.

14. The method of claim 12, comprising dividing the collection of data samples into the plurality of training corpora according to an identity of a user of a computing device providing each respective data sample.

15. The method of claim 12, comprising dividing the collection of data samples into the plurality of training corpora according to a time of acquisition of each respective data sample.

16. The method of claim 12, comprising dividing the collection of data samples into the plurality of training corpora according to a device type of a computing device providing each respective data sample.

17. The method of claim 12, comprising dividing the collection of data samples into the plurality of training corpora according to a software profile of the computing device providing each respective data sample, the software profile comprising a set of computer programs installed for execution on the respective computing device.

18. The method of claim 12, wherein the plurality of computing devices is divided among a plurality of corporate owners, the method comprising dividing the collection of data samples into the plurality of training corpora according to an owner of a computing device providing each respective data sample.

19. The method of claim 12, wherein determining whether to include the candidate feature into the reduced subset of features further comprises:
determining a plurality of similarity measures, each similarity measure of the plurality of similarity measures quantifying a similarity between a pair of frequency distributions of values of the candidate feature, each of the pair of probability measures evaluated over a distinct corpus of the plurality of training corpora; and
selecting the candidate feature into the reduced subset of features according to an average of the plurality of similarity measures.

20. The method of claim 19, comprising select the candidate feature into the reduced subset of features further according to a dispersion of the plurality of similarity measures.

21. The method of claim 12, wherein determining whether to include the candidate feature into the reduced subset of features further comprises:
for each feature of the plurality of features, evaluating a feature-specific frequency distribution of feature values of the respective feature over the first training corpus;
ranking the plurality of features according to the evaluated feature-specific frequency distributions; and
selecting the candidate feature into the reduced subset of features according to a result of the ranking.

22. The method of claim 12, wherein the plurality of features is constructed automatically by a machine learning procedure comprising training another threat detector to identify members of the collection of data samples that are indicative of the computer security threat.

23. A non-transitory computer-readable medium storing instructions which, when executed by at least one hardware processor of a computer system, cause the computer system to:
select a reduced subset of features from a plurality of features available for characterizing data samples, wherein selecting the reduced subset of features comprises:
dividing a collection of data samples acquired from a plurality of computing devices into a plurality of training corpora;
selecting a candidate feature from the plurality of features,
determining a first frequency distribution of feature values of the candidate feature over members of a first training corpus of the plurality of training corpora,
determining a second frequency distribution of feature values of the candidate feature over a second training corpus of the plurality of training corpora, and
determining whether to include the candidate feature into the reduced subset of features according to a similarity between the first and second frequency distributions; and
in response to selecting the reduced subset of features, train a threat detector to determine whether a target data sample is indicative of a computer security threat according to the reduced subset of features.

\* \* \* \* \*